(12) United States Patent
Friedl

(10) Patent No.: US 7,726,196 B2
(45) Date of Patent: Jun. 1, 2010

(54) PIEZOELECTRIC PRESSURE SENSOR CONTAINING PRE-STRESSED MEASURING ELEMENTS

(75) Inventor: Alexander Friedl, Graz (AT)

(73) Assignee: Piezocryst Advanced Sensories GmbH, Graz (AT)

( * ) Notice: Subject to any disclaimer, the term of this patent is extended or adjusted under 35 U.S.C. 154(b) by 116 days.

(21) Appl. No.: 11/785,054

(22) Filed: Apr. 13, 2007

(65) Prior Publication Data

US 2008/0011089 A1 Jan. 17, 2008

(30) Foreign Application Priority Data

Apr. 13, 2006 (AT) ................ A 641/2006

(51) Int. Cl.
*G01L 9/06* (2006.01)
(52) U.S. Cl. ...................................... 73/721
(58) Field of Classification Search ........... 73/700–756; 361/283.1–283.4
See application file for complete search history.

(56) References Cited

U.S. PATENT DOCUMENTS

| | | | | |
|---|---|---|---|---|
| 3,651,353 A | * | 3/1972 | Hugli et al. ................. | 310/334 |
| 3,960,018 A | * | 6/1976 | Change et al. ................. | 73/723 |
| 4,382,377 A | * | 5/1983 | Kleinschmidt et al. ..... | 73/35.13 |
| 4,441,044 A | * | 4/1984 | Ruckenbauer et al. ...... | 310/338 |
| 4,559,832 A | * | 12/1985 | Burlage et al. ........... | 73/861.24 |
| 5,095,741 A | * | 3/1992 | Bartig et al. ............. | 73/114.18 |
| 5,126,617 A | * | 6/1992 | Lukasiewicz et al. ....... | 310/338 |
| 5,138,885 A | * | 8/1992 | Okauchi et al. ............... | 73/723 |
| 5,142,914 A | * | 9/1992 | Kusakabe et al. ............. | 73/723 |
| 5,168,192 A | * | 12/1992 | Kosugi et al. ............... | 310/338 |
| 5,377,547 A | * | 1/1995 | Kusakabe et al. ............. | 73/723 |
| 5,537,883 A | * | 7/1996 | Okauchi et al. ............... | 73/723 |
| 5,589,638 A | | 12/1996 | Glaser et al. | |
| 5,777,239 A | * | 7/1998 | Fuglewicz ............... | 73/862.68 |

* cited by examiner

*Primary Examiner*—Lisa M Caputo
*Assistant Examiner*—Jermaine Jenkins
(74) *Attorney, Agent, or Firm*—Dykema Gossett PLLC

(57) ABSTRACT

The invention relates to a piezoelectric pressure sensor comprising piezoelectric measuring elements located in a housing, which are pre-stressed between the housing base and a membrane provided at the pressured side of the housing. According to the invention the piezoelectric measuring elements are placed on the outside of a pre-stressing element, which is located essentially along the longitudinal axis of the sensor.

8 Claims, 3 Drawing Sheets

PIEZOELECTRIC PRESSURE SENSOR CONTAINING PRE-STRESSED MEASURING ELEMENTS

BACKGROUND OF THE INVENTION

The invention relates to a piezoelectric pressure sensor with piezoelectric measuring elements located in a housing, which are pre-stressed between the housing base and a membrane provided at the pressured side of the housing.

DESCRIPTION OF THE PRIOR ART

Piezoelectric pressure sensors—in particular sensors with integrated insulation from ground—require mechanical pre-stressing of the piezoelectric measuring elements to achieve high linearity of the measurement signal. In the case of water-cooled sensors the pre-stressing is effected by a tubular spring, which encloses the measuring elements in an essentially cylindrical interior space. As is for instance shown in FIG. 1 of EP 0 745 835 A2, the tubular spring serves for reliably pressing together the piezoelectric elements, the spring itself being configured as an elastic thin cylinder with little mass. During manufacture of the pressure sensor it is impossible, however, to position the crystal elements inside the tubular spring without auxiliary elements. Thus plastic parts are inserted during manufacture to position and reliably insulate the measuring elements, which plastic parts will be subject to aging or damage in high-temperature applications, resulting in insulation losses.

In the case of pressure sensors without cooling the pre-stress can be provided by the membrane, at least in low-temperature applications, which however in the case of high-temperature sensors (at temperatures above 400° C.) will suffer stress losses due to the temperature load, leading to a change in sensor sensitivity and to a degradation of linearity.

SUMMARY OF THE INVENTION

It is the object of the present invention to improve a piezoelectric pressure sensor of the kind mentioned initially in such a way that the disadvantages inherent in the positioning of the crystal elements will be avoided and that above all plastic-free high-temperature sensors of long-term stability can be realized, which will guarantee a highly linear sensor signal even under high temperature loads.

According to the invention this object is achieved by providing that the piezoelectric sensor elements are placed on the outside of a pre-stressing element which essentially is aligned along the longitudinal axis of the sensor. By locating the pre-stressing element along the longitudinal axis of the sensor the pre-stressing element may be configured such that the path of the spring is of sufficient length and that stress losses can be efficiently avoided. Furthermore the piezo-electric measuring elements placed outside the pre-stressing element may be positioned without necessitating the use of plastic parts present in state-of-the-art sensors.

The sensor according to the invention may thus be assembled without the use of plastic parts by putting all individual parts under stress.

In a preferential variant of the invention it is provided that the piezoelectric measuring elements are configured as essentially rectangular platelets whose opposite narrow sides are subjected to the pressure of the pre-stressing element, the transversal piezoelectric effect being utilized. The pre-stressing element may for instance be located equidistantly between two or three measuring element platelets.

Another variant of the invention provides that the housing has an inner housing containing the piezoelectric measuring elements, which is enveloped with play by an outer housing and is attached to the outer housing in the area of the membrane, preferably by welding.

It is of particular advantage if the central pre-stressing element also serves as a signal lead.

DESCRIPTION OF THE DRAWINGS

The invention will now be explained in more detail with reference to the enclosed drawings. There is shown in:

FIG. 3 the variant of FIG. 2 in a section along line III-III of FIG. 2; and in

Figure 1:
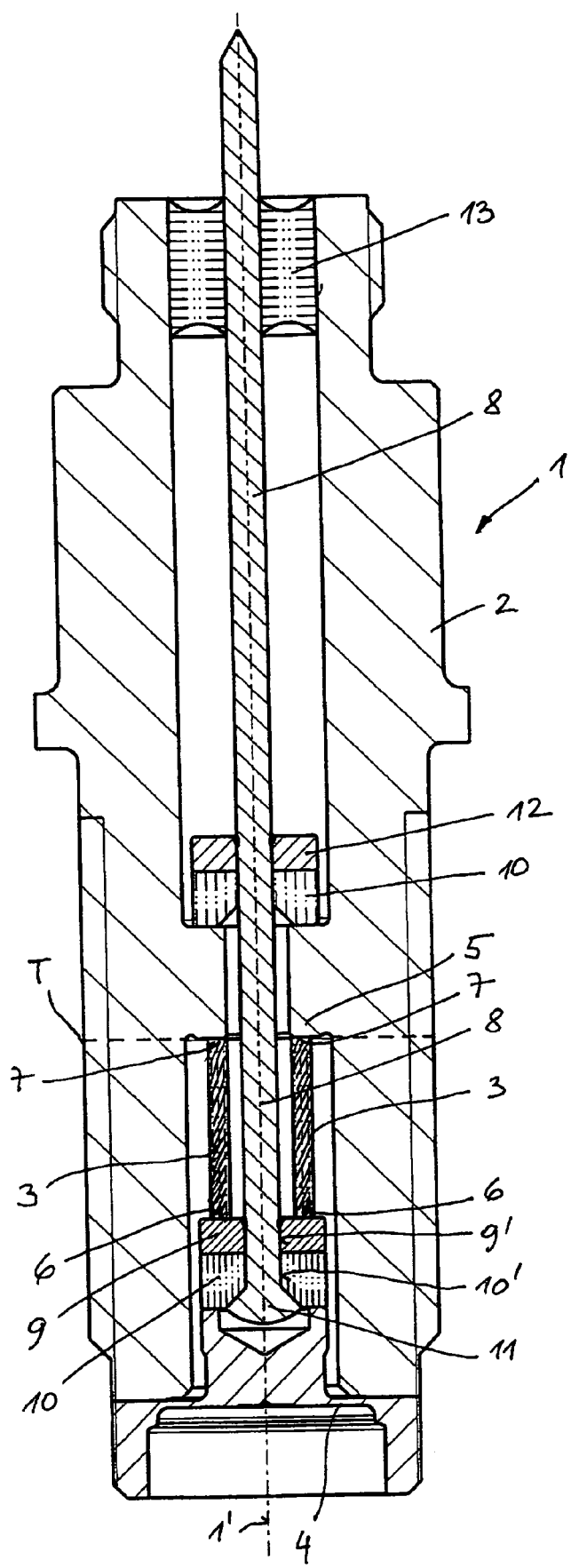
FIG. 1 an axial section of a first variant of a pressure sensor according to the invention.

The piezoelectric pressure sensor 1 shown in FIG. 1 has piezoelectric measuring elements 3 placed in a housing 2, which are pre-stressed between a membrane 4 and the housing base 5. The membrane 4 may have any shape and is welded to the pressured end of the housing 2 in a way not further shown. The two piezoelectric measuring elements 3 are essentially rectangular platelets with plane or slightly curved side faces whose opposing narrow sides 6, 7 are subjected to pressure, the transversal piezoelectric effect being employed. The two piezoelectric measuring elements 3 lie outside a pre-stressing element 8, which is placed essentially along the sensor's longitudinal axis and pre-stresses the piezoelectric measuring elements 3 against housing base 5. In the same way as two parallel measuring element platelets are disposed in the variant shown in the Figure, more measuring element platelets could be disposed in other variants (not shown here), three elements being for instance disposed in a triangle equidistant to the pre-stressing element 8.

The housing 2 is partitioned along line T, for instance, where the housing parts are welded together after the measuring elements 3 have been put in place.

The piezoelectric measuring elements 3 are provided with an annular pick-up electrode 9 on their narrow sides 6, and towards the membrane 4 with an electrically insulating element 10, the variant shown in the drawing having an electrically conductive connection between the pre-stressing element 8 and the pick-up electrode 9, such that the central pre-stressing element 8 also serves as a signal lead. The measurement is taken relative to housing-ground.

The pre-stressing element 8 passes through the pick-up electrode 9 and the insulating element 10 via openings 9' and 10', the pre-stressing element 8 being anchored in the insulating element 10 by means of a conical projection 11 and being pre-stressed against another insulating element 10 located at the side of the sensor housing opposite the housing base 5. The pre-stressing element 8 is held in the pre-stressed position by means of a fixing element 12, said fixing element 12 being screwed or welded to the central pre-stressing element 8.

The pre-stressing element 8, which also serves as signal lead, exits the sensor housing 2 on the side opposite the membrane 4, passing through an insulating element 13 which can be made of ceramic material like the insulating elements 10. The result of this design is a low-cost, non-cooled high-temperature pressure sensor, which can also be produced for small bore diameters in the 5 mm range without using any plastic parts for centering the measuring elements 3.

Figure 2:
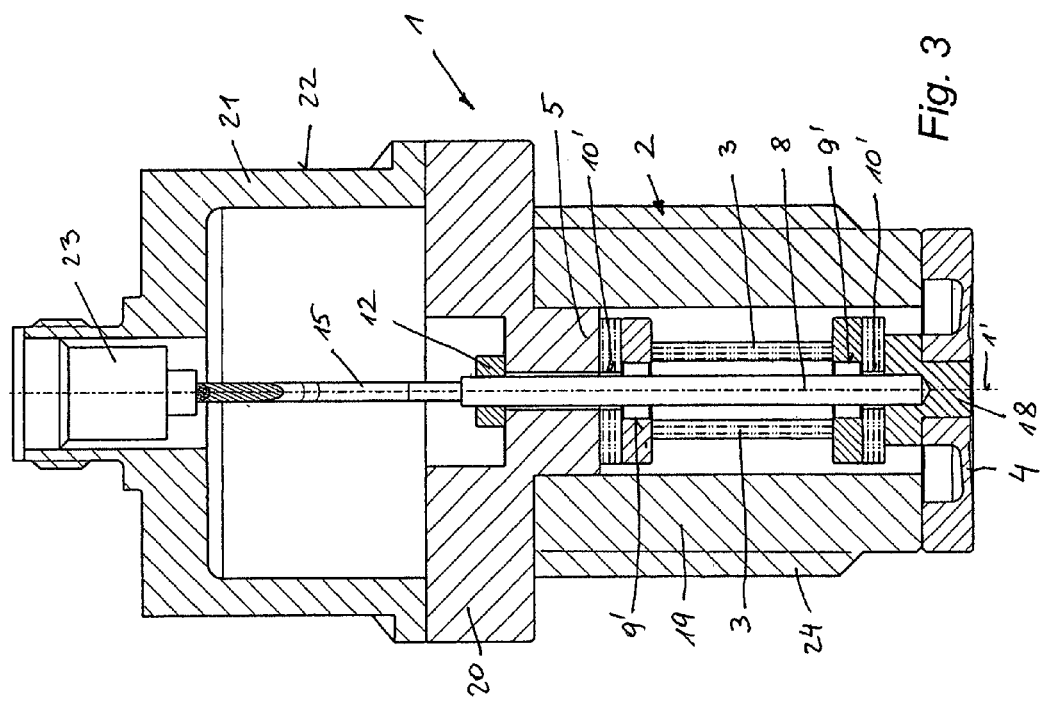
FIG. 2 a second variant of the pressure sensor according to the invention, again in axial section.
Figure 3:
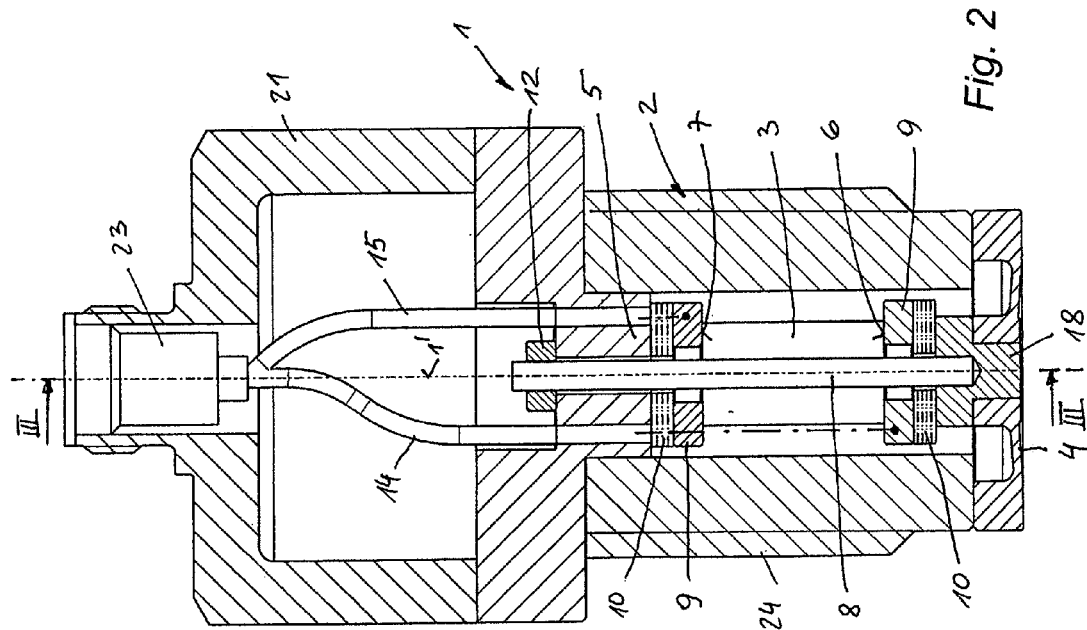

The variant of FIGS. 2 and 3 shows a piezoelectric high-temperature pressure sensor insulated against ground. The pre-stressing element 8 is here also placed equidistantly between two piezoelectric measuring elements 3, the platelet-shaped measuring elements 3 each having at each of their narrow sides 6 and 7 in the direction of the applied force a pick-up electrode 9 and an insulating element 10. In the variant of FIGS. 2 and 3 the pre-stressing element 8 is anchored in a central middle part 18 of the membrane 4 (for instance by screwing or welding), and passes through the openings 9' and 10' of the pick-up electrodes 9 and the insulating elements 10, and is pre-stressed by means of a fixing element 12 on the side of housing 2 opposite the housing base 5. As in the variant of FIG. 1 the fixing element may be screwed or welded to the pre-stressing element 8.

In the variant shown the housing 2 consists of a number of parts, i.e., a cylindrical jacket 19, a disc-shaped middle part 20 with the housing base 5, and a housing cover 21 with hexagonal exterior 22 and a socket 23. The individual parts of the housing are welded together. The pressure sensor 1 may be plugged into a measuring bore (not shown) or may be screwed into the bore by means of an external thread 24 on the jacket 19.

As can be seen in particular from FIG. 2 the pre-stressing element 8 is here not used to carry the signal, but two separate signal leads 14 and 15 are provided, which are conductively connected with the corresponding annular pick-up electrodes 9 at the narrow sides 6 and 7 of the piezoelectric measuring elements 3—as indicated in the drawing by dotted lines.

Figure 4:
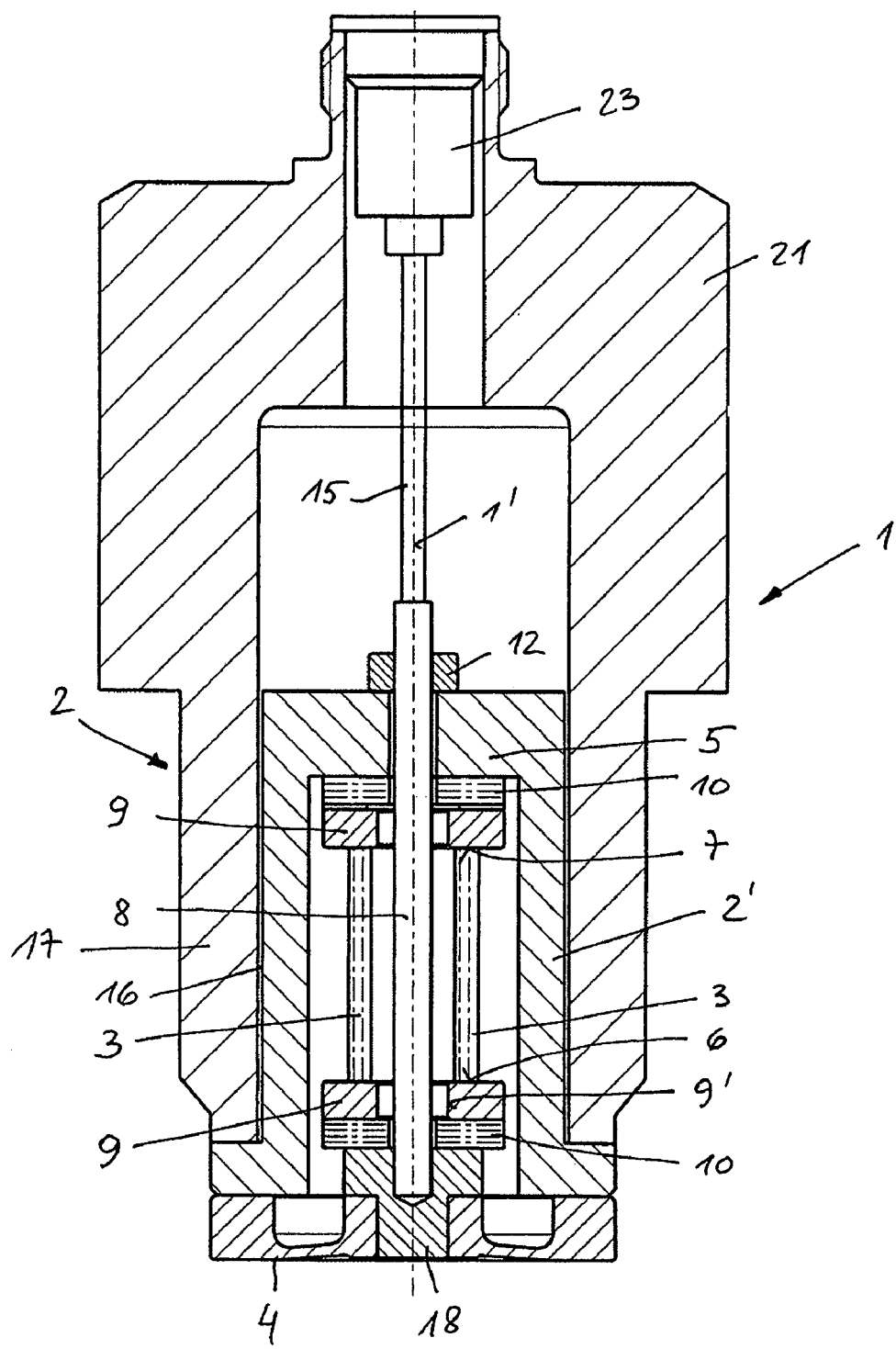
FIG. 4 a third variant of the pressure sensor according to the invention in an axial section.

FIG. 4 shows a variant of the pressure sensor of FIG. 3 as a further example of the invention. According to the invention the housing 2 has an interior housing 2' containing the piezoelectric measuring elements 3, which is, with some play 16, enclosed by an exterior housing 17 and is fastened to the exterior housing in the area of the membrane 4, preferably by welding. This design will minimize the influence of temperature-dependent deformation of the housing on the measuring elements 3.

What is claimed is:

1. A piezoelectric pressure sensor which comprises a housing that defines a base therein and a longitudinal axis therethrough, a membrane located at a pressured side of the housing, a pre-stressing element which extends along said longitudinal axis, and a plurality of piezoelectric measuring elements located in the housing, to be pre-stressed between the membrane and the housing base, the piezoelectric measuring elements being positioned radially around the pre-stressing element, the pre-stressing element extending beyond opposite ends of the piezoelectric measuring elements.

2. The pressure sensor according to claim 1, wherein the piezoelectric measuring elements using transversal piezoelectric effect are configured as rectangular measuring element platelets having narrow sides subjected to pressure of the pre-stressing element.

3. The pressure sensor according to claim 2, wherein the pre-stressing element is placed equidistantly between two, three, or more rectangular measuring element platelets.

4. The pressure sensor according to claim 2, wherein each piezoelectric measuring element is provided with a pick-up electrode at least at one narrow side and an electrically insulating element in a direction of force input.

5. The pressure sensor according to claim 4, wherein each pick-up electrode and each insulating element have an opening each through which the pre-stressing element passes.

6. The pressure sensor according to claim 1, wherein the pre-stressing element serves as a signal lead.

7. The pressure sensor according to claim 1, wherein the housing comprises an interior housing containing the piezoelectric measuring elements, which is enclosed by an exterior housing and is fastened to the exterior housing in an area of the membrane.

8. The pressure sensor according to claim 7, wherein the interior housing is fastened to the exterior housing by a weld.

\* \* \* \* \*

UNITED STATES PATENT AND TRADEMARK OFFICE
CERTIFICATE OF CORRECTION

PATENT NO. : 7,726,196 B2  Page 1 of 1
APPLICATION NO. : 11/785054
DATED : June 1, 2010
INVENTOR(S) : Friedl It is certified that error appears in the above-identified patent and that said Letters Patent is hereby corrected as shown below:

Title page, item (73) should read
--(73) Assignee: Piezocryst Advanced Sensorics GmbH,
              Graz (AT)--

Signed and Sealed this

Thirty-first Day of August, 2010

David J. Kappos
*Director of the United States Patent and Trademark Office*